United States Patent
Daskoski

(10) Patent No.: US 12,263,907 B1
(45) Date of Patent: Apr. 1, 2025

(54) SUPPLEMENTAL SIDE MIRROR ASSEMBLY FOR A MOTORCYCLE

(71) Applicant: Raymond Daskoski, Augusta, GA (US)

(72) Inventor: Raymond Daskoski, Augusta, GA (US)

(*) Notice: Subject to any disclaimer, the term of this patent is extended or adjusted under 35 U.S.C. 154(b) by 0 days.

(21) Appl. No.: 18/933,809

(22) Filed: Oct. 31, 2024

(51) Int. Cl.
*B62J 29/00* (2006.01)

(52) U.S. Cl.
CPC ................................ *B62J 29/00* (2013.01)

(58) Field of Classification Search
CPC .................................................. B62J 29/00
USPC .......................................................... 359/842
See application file for complete search history.

(56) References Cited

U.S. PATENT DOCUMENTS

| | | | | |
|---|---|---|---|---|
| 2,413,894 A * | 1/1947 | Sorensen | ............... | B60R 1/081 |
| | | | | D12/189 |
| 2,764,913 A * | 10/1956 | Green | ............... | B60R 1/006 |
| | | | | 359/855 |
| 4,208,104 A * | 6/1980 | Peterson | ............... | B60R 1/081 |
| | | | | 248/487 |
| 4,252,290 A * | 2/1981 | Willey | ............... | B62J 29/00 |
| | | | | 248/549 |
| 4,359,266 A * | 11/1982 | Rohlf | ............... | B62B 9/00 |
| | | | | 359/881 |
| 6,217,180 B1 * | 4/2001 | Eisenbraum | ............... | B62B 9/005 |
| | | | | 359/872 |
| 7,434,492 B1 * | 10/2008 | Morales | ............... | B62K 23/00 |
| | | | | 74/551.8 |
| 2002/0067557 A1 * | 6/2002 | Coleburn | ............... | B62J 29/00 |
| | | | | 359/850 |
| 2011/0140471 A1 * | 6/2011 | Suesse | ............... | B62J 29/00 |
| | | | | 296/1.11 |
| 2015/0183374 A1 * | 7/2015 | Liu | ............... | B60R 1/078 |
| | | | | 359/865 |
| 2020/0384921 A1 * | 12/2020 | Stanger | ............... | B62J 29/00 |
| 2022/0274527 A1 * | 9/2022 | Stanger | ............... | B60R 1/076 |

OTHER PUBLICATIONS

"Retro Motorcycle Rearview Side Mirrors Universal 4" Round Multi-fit for Cruiser Chopper Café Racer Old School Bobber Touring Kymco Yamaha Custom Kawasaki", Amazon.com., Retrieved Date Dec. 12, 2024, Earliest Review Date Aug. 20, 2021, pp. 1-5. (Year: 2021).*

* cited by examiner

*Primary Examiner* — Ricky D Shafer

(57) ABSTRACT

A supplemental side mirror assembly for a motorcycle includes a mirror, a shell attached to the mirror, and an arm attached to the shell. The arm is positioned to extend away from the shell. A base is coupled to a free end of the arm. A first clamp member is coupled to the base. The first clamp member is C-shaped. A second clamp member is detachably coupled to the first clamp member. The second clamp member is C-shaped such that the first clamp member and the second clamp member together define a cylindrical passage when coupled together. The first clamp member and the second clamp member are designed to be clamped onto a support arm of a side view mirror attached to a handlebar of a motorcycle, such that the mirror is positioned above the side view mirror of the motorcycle to provide an expanded field of view.

16 Claims, 7 Drawing Sheets

12,263,907 B1

SUPPLEMENTAL SIDE MIRROR ASSEMBLY FOR A MOTORCYCLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to side and rear view mirrors for motorcycles and more particularly pertains to a new supplemental side mirror assembly to be positioned above a primary side mirror of a motorcycle to provide an expanded field of view. Unlike automobiles, motorcycles do not have a rearview mirror, only a right and left side view mirror that are adjusted to provide both rear and side views. As such, the operator must find a compromised adjustment between the side view and the rear view. Replacing the mirror with a built-in blind spot mirror or adding a stick-on blind spot mirror can help, but these types of mirrors distort the view and do not eliminate a compromised adjustment. The new supplemental side mirror assembly provides an additional, undistorted view that can compensate for the shortcomings of current side view mirrors.

(2) Description of Related Art Including Information Disclosed Under 37 CFR 1.97 and 1.98

The prior art relates to side and rear view mirrors for motorcycles, and generally disclose either centrally-mounted rear view mirrors like in automobiles, or disclose wide angle side view mirrors that can be distorted. The prior art, as best understood, does not disclose a supplemental side mirror that is mounted on an existing side view mirror to provide an additional view area that is not distorted.

BRIEF SUMMARY OF THE INVENTION

An embodiment of the disclosure meets the needs presented above in a supplemental side mirror assembly generally comprising a mirror, a shell attached to the mirror, and an arm attached to the shell. The arm is positioned to extend away from the shell. A base is coupled to a free end of the arm. A first clamp member is coupled to the base. The first clamp member is C-shaped. A second clamp member is detachably coupled to the first clamp member. The second clamp member is C-shaped such that the first clamp member and the second clamp member together define a cylindrical passage when coupled together. The first clamp member and the second clamp member are designed to be clamped onto a support arm of a side view mirror attached to a handlebar of a motorcycle, such that the mirror is positioned above the side view mirror of the motorcycle to provide an expanded field of view.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
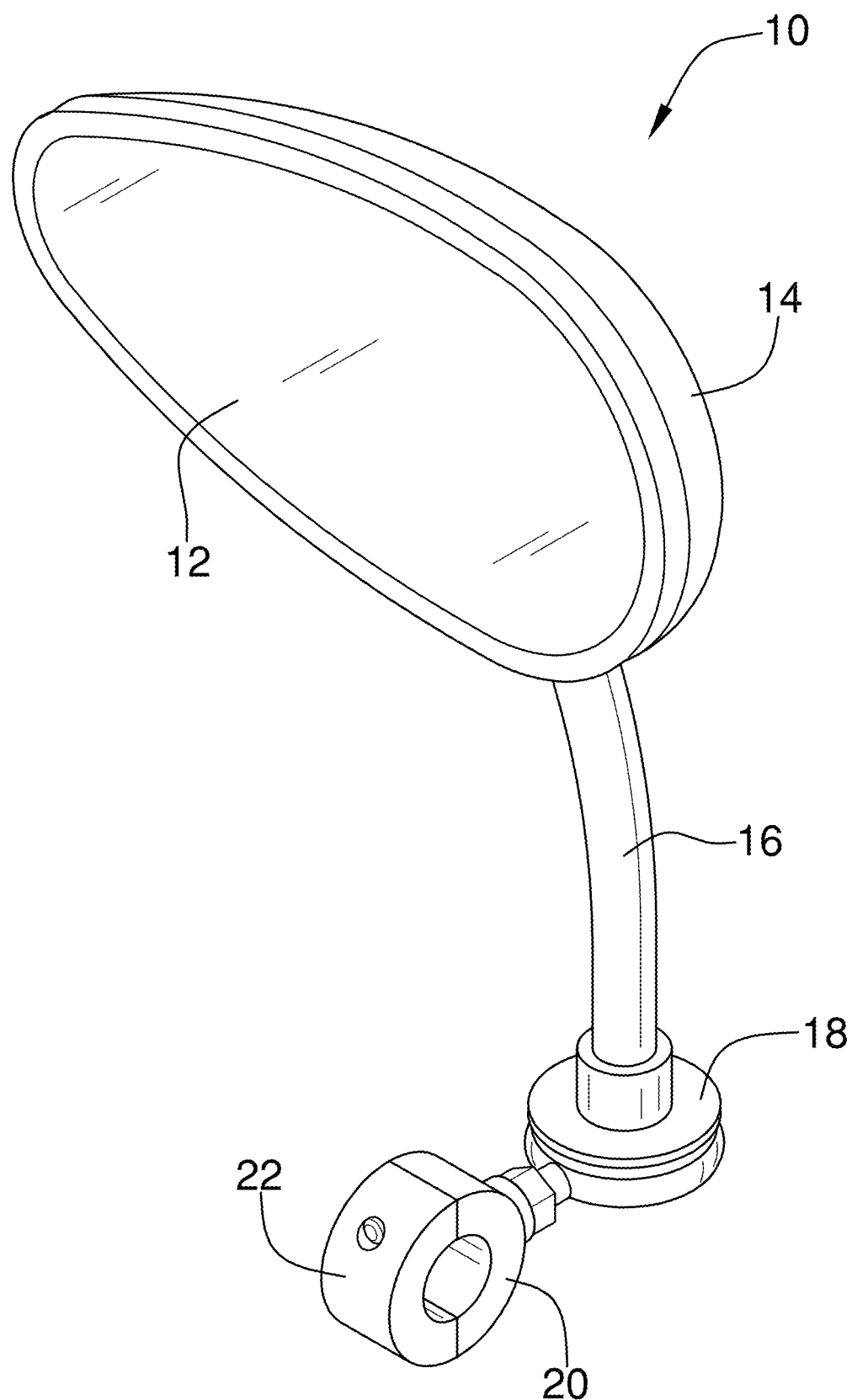
FIG. 1 is a front perspective view of a supplemental side mirror assembly according to an embodiment of the disclosure.
Figure 2:
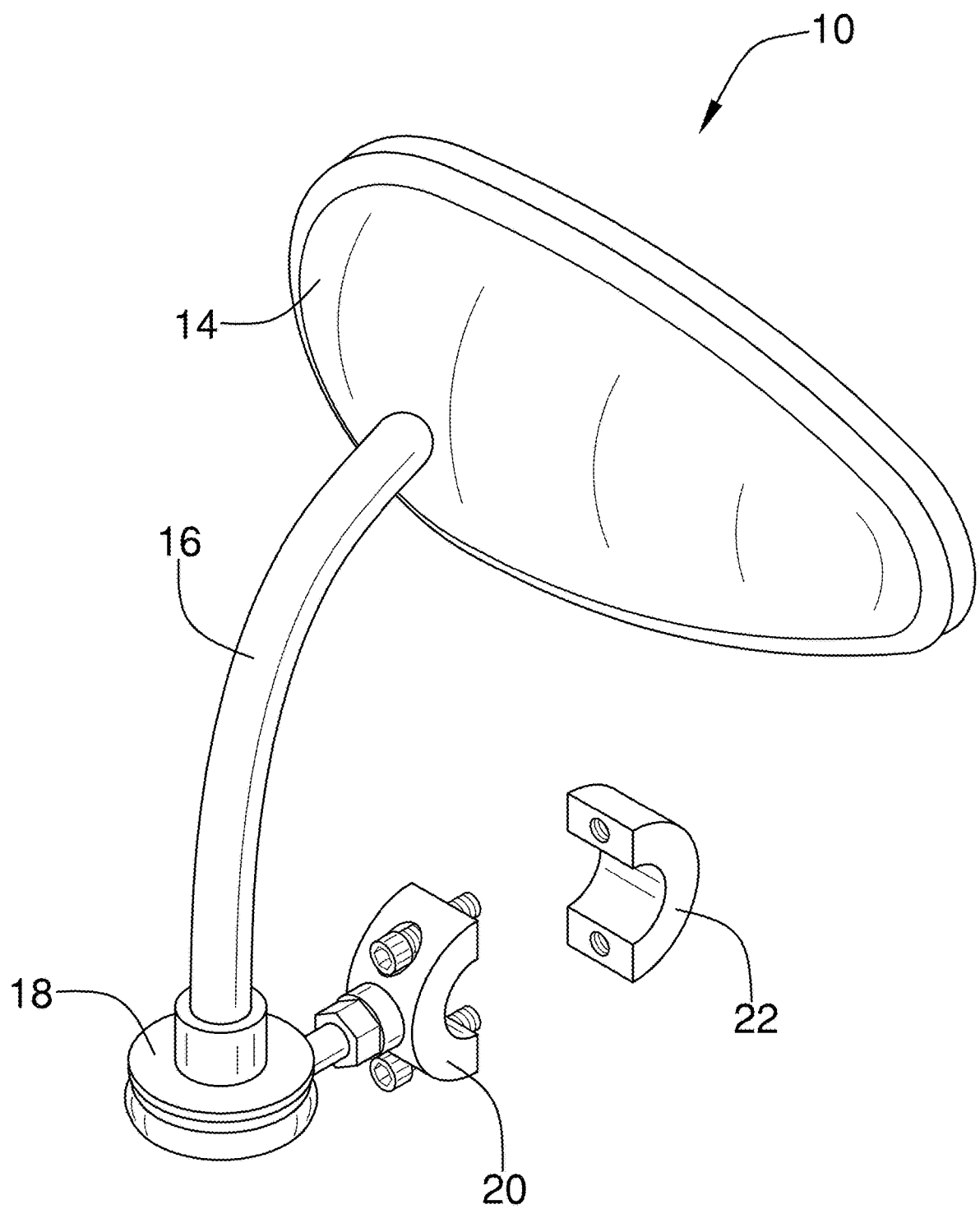
FIG. 2 is a rear perspective view of an embodiment of the disclosure.

With reference now to the drawings, and in particular to FIGS. 1 through 7 thereof, a new supplemental side mirror assembly embodying the principles and concepts of an embodiment of the disclosure and generally designated by the reference numeral 10 will be described.

As best illustrated in FIGS. 1 through 7, the supplemental side mirror assembly 10 generally comprises a mirror 12, a shell 14 attached to the mirror 12, and an arm 16 attached to the shell 14. The arm 16 is positioned to extend away from the shell 14. A base 18 is coupled to a free end of the arm 16. A first clamp member 20 is coupled to the base 18. The first clamp member 20 is C-shaped. A second clamp member 22 is detachably coupled to the first clamp member 20. The second clamp member 22 is C-shaped such that the first clamp member 20 and the second clamp member 22 together define a cylindrical passage when coupled together. The first clamp member 20 and the second clamp member 22 are designed to be clamped onto a support arm 76 of a side view mirror 74 attached to a handlebar 72 of the motorcycle 70, such that the mirror 12 is positioned above the side view mirror 74 of the motorcycle 70 to provide an expanded field of view.

The arm 16 is adjustably coupled to the base 18 to selectively adjust the arm 16 up and down to adjust a vertical position of the mirror 12 with respect to the side view mirror 74 of the motorcycle 70. In the exemplary embodiment shown in FIG. 3, the base 18 includes a passage 24. The arm 16 includes a shaft 26 projecting out from the free end and through the passage 24, wherein the shaft 26 is positionable within the passage 24 to selectively adjust the arm 16 up and down to adjust the vertical position of the mirror 12. The supplemental side mirror assembly 10 further includes an adjustment nut 28 connectable to the shaft 26 to releasably secure the shaft 26 in place in the passage 24 after selective adjustment of the arm 16. Other adjustment mechanisms for adjusting a structure up and down are well known within the mechanical arts and within the scope of the disclosure.

The base 18 is adjustably coupled to the first clamp member 20 to selectively adjust the base 18 back and forth to adjust a horizontal position of the mirror 12 with respect to the side view mirror 74 of the motorcycle 70. In the exemplary embodiment shown in FIG. 3, the first clamp member 20 includes a receptacle 30. The base 18 includes a rod 32 projecting out from the base 18 and into the receptacle 30, wherein the rod 32 is positionable within the receptacle 30 to selectively adjust the base 18 back and forth to adjust the horizontal position of the mirror 12. The supplemental side mirror assembly 10 further includes an adjustment nut 28 connectable to the rod 32 to releasably secure the rod 32 in place in the receptacle 30 after selective adjustment of the arm 16. Other adjustment mechanisms for adjusting a structure back and forth are well known within the mechanical arts and within the scope of the disclosure.

Figure 3:
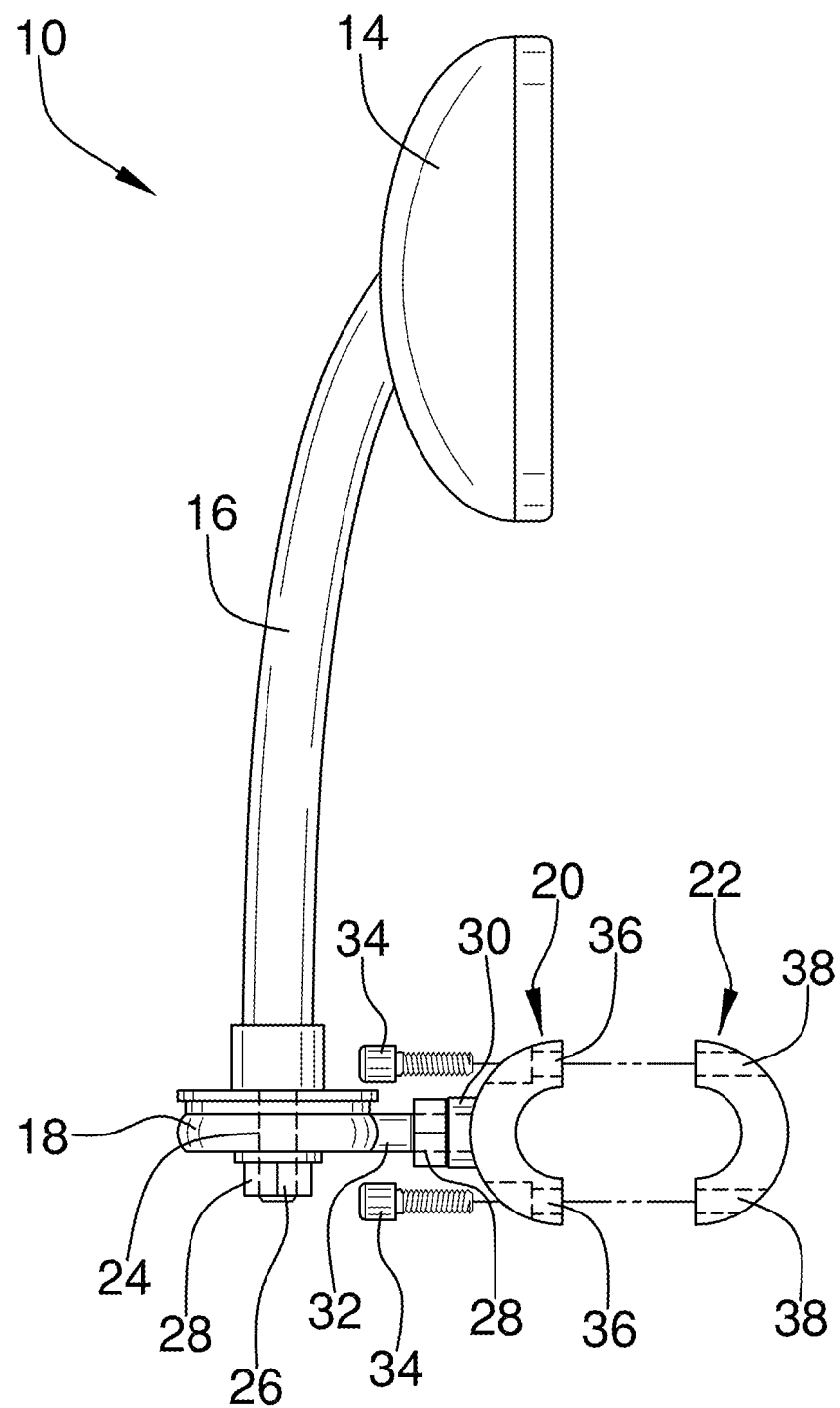
FIG. 3 is a side view of an embodiment of the disclosure.

In the exemplary embodiment in FIG. 3, the supplemental side mirror assembly 10 further includes a pair of threaded connectors 34 inserted through a respective pair of openings 36 in the first clamp member 20 and into a respective pair of threaded receptacles 38 in the second clamp member 22 to connect the first clamp member 20 to the second clamp member 22. The first clamp member 20 and the second clamp member 22 could also be connected by snaps or clasps.

Figure 4:
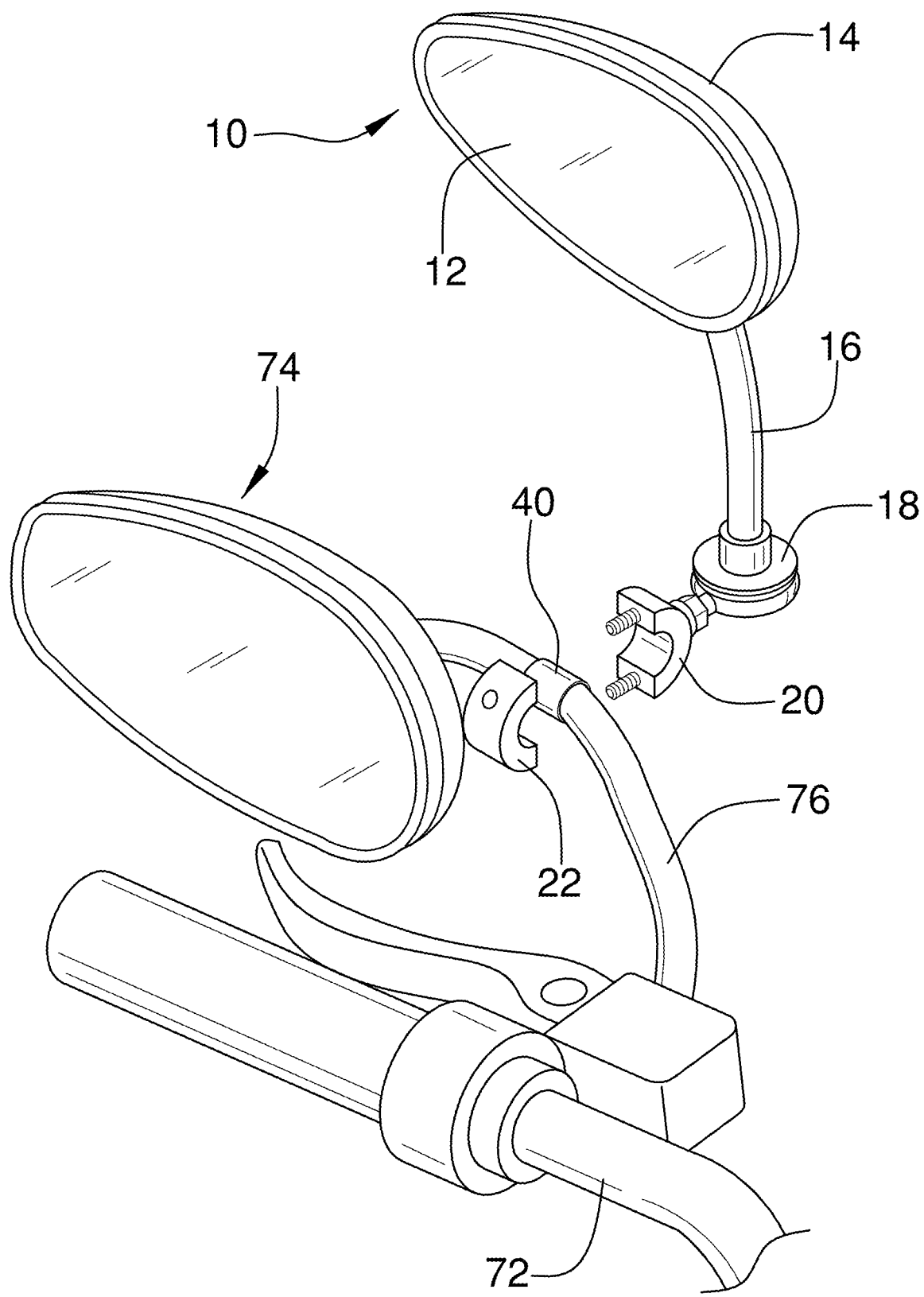
FIG. 4 is a front perspective view of an embodiment of the disclosure in use.
Figure 5:
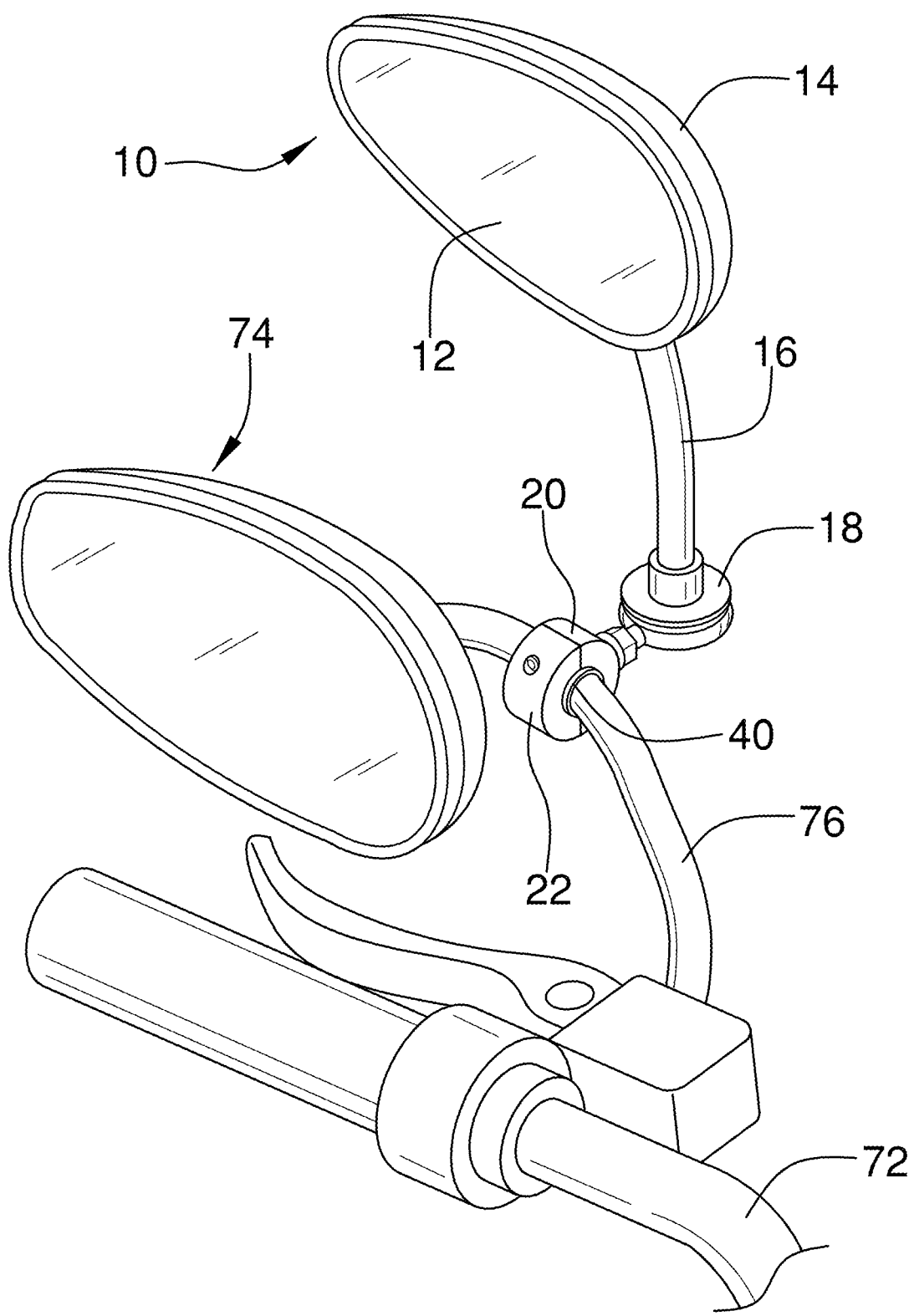
FIG. 5 is a front perspective view of an embodiment of the disclosure in use.

As best seen in FIG. 4, the supplemental side mirror assembly 10 further includes a sleeve 40 that is designed to be placed onto the support arm 76 of the side view mirror 74 of the motorcycle 70, wherein the first clamp member 20 and the second clamp member 22 are designed to be clamped onto the sleeve 40. In one possible embodiment, the sleeve 40 is made of a heat-shrinkable material that may be heat shrunk in place. The sleeve 40 could also be an elastomer or rubber material fitted for the support arm 76.

Figure 7:
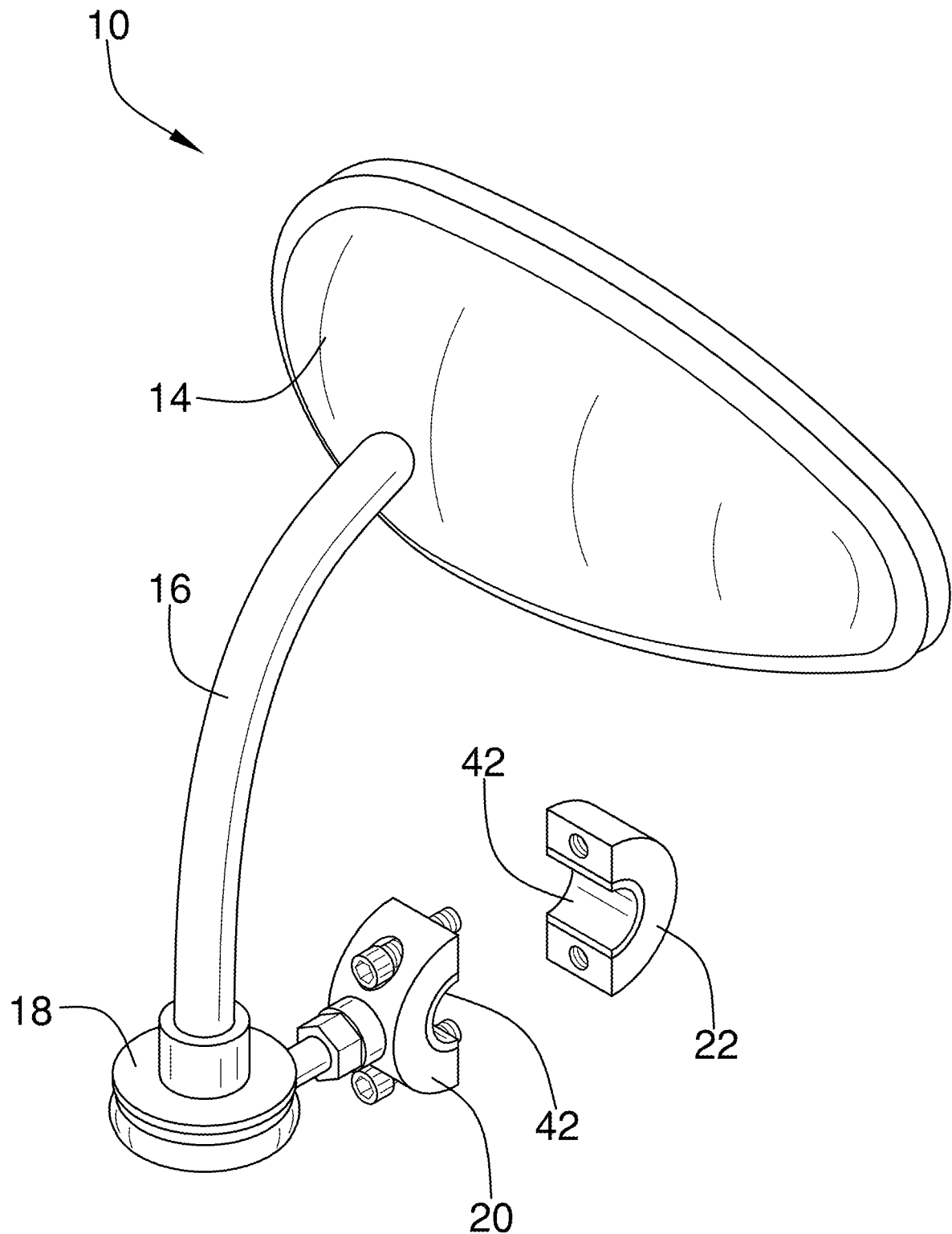
FIG. 7 is a rear perspective view of an alternative embodiment of the disclosure.

FIG. 7 shows an alternative to the sleeve 40. In this embodiment, the supplemental side mirror assembly 10 further includes a pair of resilient material layers 42. Each of the resilient material layers 42 is attached to an inner surface of a respective one of the first clamp member 20 and the second clamp member 22 such that the resilient material layers 42 are in contact with the support arm 76 of the side view mirror 74 of the motorcycle 70 when the first clamp member 20 and the second clamp member 22 are clamped onto the support arm 76. Each of the resilient material layers 42 could be an elastomer, a rubber, or a foam material, for example. Regardless of the exact design, the purpose of the sleeve 40 and the resilient material layers 42 is to protect the support arm 76, ensure a firm grip, and compensate for tolerances.

Figure 6:
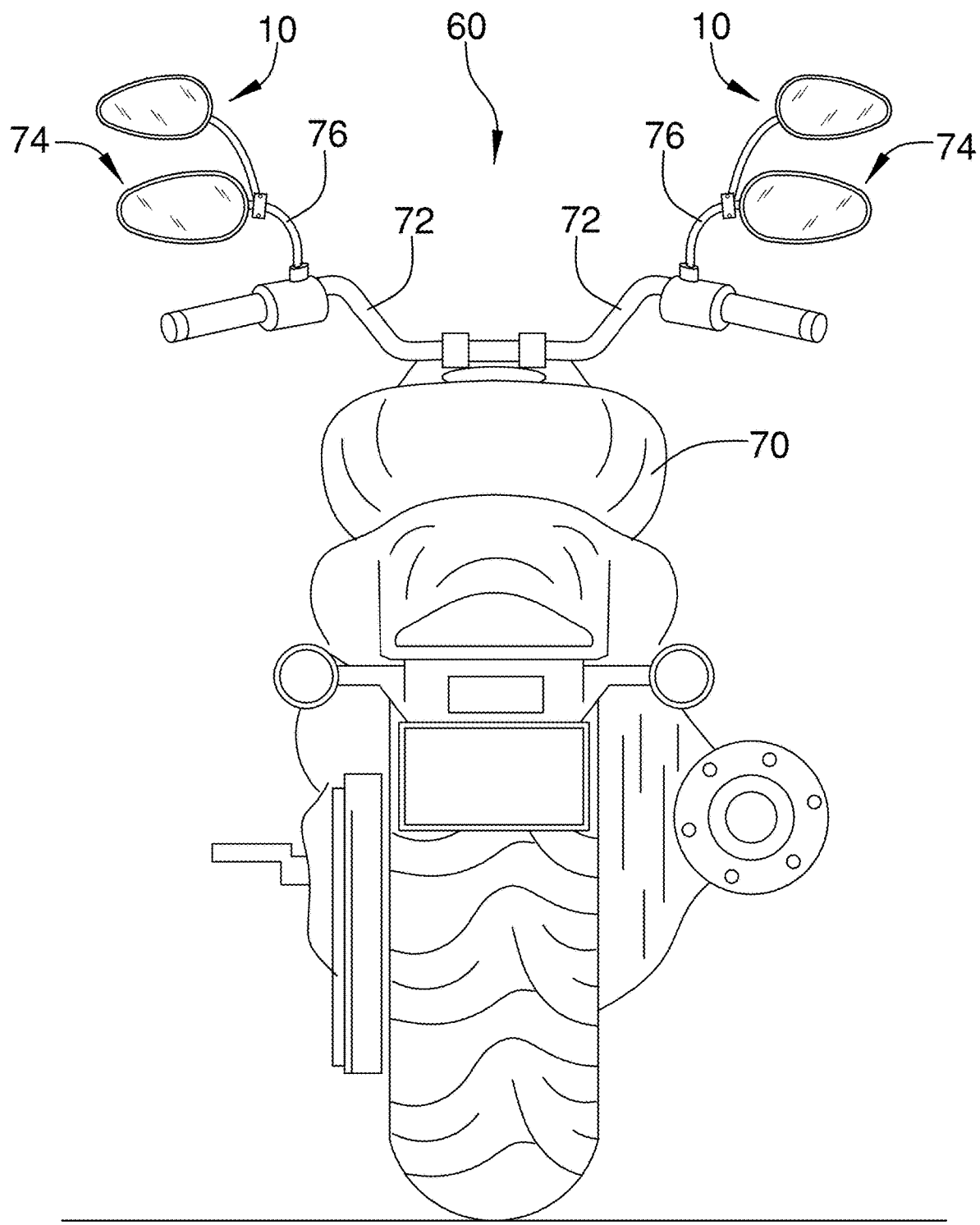
FIG. 6 is a front view of an embodiment of the disclosure in use.

FIG. 6 shows the supplemental side mirror assembly 10 installed as part of a motorcycle handlebar assembly 60. The motorcycle handlebar assembly 60 includes a pair of the handlebars 72 and a pair of the side view mirrors 74. Each of the side view mirrors 74 includes the support arm 76 attached to a respective one of the handlebars 72. Each of a pair of the supplemental side mirror assemblies 10 is coupled to a respective one of the side view mirrors 74. In one possible embodiment, the supplemental side mirror 12 is retrofitted onto an existing handlebar 72. In another possible embodiment, the supplemental side mirror 12 is factory installed as part of the complete motorcycle handlebar assembly 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A supplemental side mirror assembly for a motorcycle comprising:
   a mirror;
   a shell being attached to said mirror;
   an arm being attached to said shell, said arm being disposed to extend away from said shell;
   a base being coupled to a free end of said arm;
   a first clamp member being coupled to said base, said first clamp member being C-shaped;
   a second clamp member detachably coupled to said first clamp member, said second clamp member being C-shaped such that said first clamp member and said second clamp member together define a cylindrical passage when coupled together, wherein said first clamp member and said second clamp member are configured to be clamped onto a support arm of a side view mirror attached to a handlebar of a motorcycle, such that said mirror is positioned above the side view mirror of the motorcycle to provide an expanded field of view; and
   wherein said arm is adjustably coupled to said base to selectively adjust said arm up and down to adjust a vertical position of said mirror with respect to the side view mirror of the motorcycle.

2. The supplemental side mirror assembly of claim 1, wherein:

said base includes a passage;

said arm includes a shaft projecting out from said free end and through said passage, wherein said shaft is positionable within said passage to selectively adjust said arm up and down to adjust the vertical position of said mirror; and the supplemental side mirror assembly further includes an adjustment nut connectable to said shaft to releasably secure said shaft in place in said passage after selective adjustment of said arm.

3. The supplemental side mirror assembly of claim 2, wherein:

said base is adjustably coupled to said first clamp member to selectively adjust said base back and forth to adjust a horizontal position of said mirror with respect to the side view mirror of the motorcycle;

said first clamp member includes a receptacle;

said base includes a rod projecting out from said base and into said receptacle, wherein said rod is positionable within said receptacle to selectively adjust said base back and forth to adjust the horizontal position of said mirror;

the supplemental side mirror assembly further comprises an adjustment nut connectable to said rod to releasably secure said rod in place in said receptacle after selective adjustment of said arm; and the supplemental side mirror assembly further comprises a pair of threaded connectors inserted through a respective pair of openings in said first clamp member and into a respective pair of threaded receptacles in said second clamp member to connect said first clamp member to said second clamp member.

4. The supplemental side mirror assembly of claim 3, further comprising a sleeve being configured to be placed onto the support arm of the side view mirror of the motorcycle, wherein said first clamp member and said second clamp member are configured to be clamped onto said sleeve, and wherein said sleeve is made of a heat-shrinkable material.

5. The supplemental side mirror assembly of claim 3, further comprising a pair of resilient material layers, wherein each of said resilient material layers is attached to an inner surface of a respective one of said first clamp member and said second clamp member such that said resilient material layers are in contact with the support arm of the side view mirror of the motorcycle when said first clamp member and said second clamp member are clamped onto the support arm.

6. The supplemental side mirror assembly of claim 1, wherein:

said first clamp member includes a receptacle;

said base includes a rod projecting out from said base and into said receptacle, wherein said rod is positionable within said receptacle to selectively adjust said base back and forth to adjust the horizontal position of said mirror; and the supplemental side mirror assembly further comprises an adjustment nut connectable to said rod to releasably secure said rod in place in said receptacle after selective adjustment of said arm.

7. The supplemental side mirror assembly of claim 1, further comprising a pair of threaded connectors inserted through a respective pair of openings in said first clamp member and into a respective pair of threaded receptacles in said second clamp member to connect said first clamp member to said second clamp member.

8. The supplemental side mirror assembly of claim 1, further comprising a sleeve being configured to be placed onto the support arm of the side view mirror of the motorcycle, wherein said first clamp member and said second clamp member are configured to be clamped onto said sleeve.

9. The supplemental side mirror assembly of claim 8, wherein said sleeve is made of a heat-shrinkable material.

10. The supplemental side mirror assembly of claim 1, further comprising a pair of resilient material layers, wherein each of said resilient material layers is attached to an inner surface of a respective one of said first clamp member and said second clamp member such that said resilient material layers are in contact with the support arm of the side view mirror of the motorcycle when said first clamp member and said second clamp member are clamped onto the support arm.

11. A supplemental side mirror assembly for a motorcycle comprising:

a mirror;

a shell being attached to said mirror;

an arm being attached to said shell, said arm being disposed to extend away from said shell;

a base being coupled to a free end of said arm;

a first clamp member being coupled to said base, said first clamp member being C-shaped;

a second clamp member detachably coupled to said first clamp member, said second clamp member being C-shaped such that said first clamp member and said second clamp member together define a cylindrical passage when coupled together, wherein said first clamp member and said second clamp member are configured to be clamped onto a support arm of a side view mirror attached to a handlebar of a motorcycle, such that said mirror is positioned above the side view mirror of the motorcycle to provide an expanded field of view; and wherein said base is adjustably coupled to said first clamp member to selectively adjust said base back and forth to adjust a horizontal position of said mirror with respect to the side view mirror of the motorcycle.

12. A motorcycle handlebar assembly comprising:

a pair of handlebars;

a pair of side view mirrors, each of said side view mirrors including a support arm attached to a respective one of said handlebars;

a pair of supplemental side mirror assemblies, each of said supplemental side mirror assemblies being coupled to a respective one of said side view mirrors, each of said supplemental side mirror assemblies including;

a mirror;

a shell being attached to said mirror;

an arm being attached to said shell, said arm being disposed to extend away from said shell;

a base being coupled to a free end of said arm;

a first clamp member being coupled to said base, said first clamp member being C-shaped; and a second clamp member detachably coupled to said first clamp member, said second clamp member being C-shaped such that said first clamp member and said second clamp member together define a cylindrical passage when coupled together, wherein said first clamp member and said second clamp member are clamped onto said support arm of its respective side view mirror, such that said mirror is positioned above its respective side view mirror to provide an expanded field of view; and wherein said arm is adjustably coupled to said base to selectively adjust said arm up and down to adjust a vertical position of said mirror with respect to its respective side view mirror.

13. The motorcycle handlebar assembly of claim 12, wherein:
    said base includes a passage;
    said arm includes a shaft projecting out from said free end and through said passage, wherein said shaft is positionable within said passage to selectively adjust said arm up and down to adjust the vertical position of said mirror; and
    the supplemental side mirror assembly further includes an adjustment nut connectable to said shaft to releasably secure said shaft in place in said passage after selective adjustment of said arm.

14. The motorcycle handlebar assembly of claim 13, wherein:
    said base is adjustably coupled to said first clamp member to selectively adjust said base back and forth to adjust a horizontal position of said mirror with respect to its respective side view mirror;
    said first clamp member includes a receptacle;
    said base includes a rod projecting out from said base and into said receptacle, wherein said rod is positionable within said receptacle to selectively adjust said base back and forth to adjust the horizontal position of said mirror;
    the supplemental side mirror assembly further comprises an adjustment nut connectable to said rod to releasably secure said rod in place in said receptacle after selective adjustment of said arm; and
    the supplemental side mirror assembly further comprises a pair of threaded connectors inserted through a respective pair of openings in said first clamp member and into a respective pair of threaded receptacles in said second clamp member to connect said first clamp member to said second clamp member.

15. The motorcycle handlebar assembly of claim 14, wherein:
    each of said supplemental side mirror assemblies further comprises a sleeve placed onto said support arm of its respective side view mirror;
    said first clamp member and said second clamp member are clamped onto said sleeve; and
    said sleeve is made of a heat-shrinkable material.

16. The motorcycle handlebar assembly of claim 14, wherein:
    each of said supplemental side mirror assemblies further comprises a pair of resilient material layers; and
    each of said resilient material layers is attached to an inner surface of a respective one of said first clamp member and said second clamp member such that said resilient material layers are in contact with said support arm of its respective side view mirror.

* * * * *